2,741,651

SYNTHETIC RESINS FORMED BY HEATING TOGETHER A PHENOL-TERPENE RESIN WITH A PHENOL ALDEHYDE RESIN

Jerome Been and Martin M. Grover, Rutherford, N. J., assignors to Rubber and Asbestos Corporation, Bloomfield, N. J., a corporation of New Jersey No Drawing. Application June 3, 1952,
Serial No. 291,560

9 Claims. (Cl. 260—43)

This invention relates to novel synthetic resins prepared by reacting heat-hardening phenolic-aldehyde resins with resinous reaction products of terpenic compounds and phenols. It relates more particularly to such resins as used in the preparation of improved coatings, adhesives, inks and similar compositions.

In the formulation of coatings and adhesives it is often desirable to incorporate film forming resins which are compatible with the other ingredients and which increase the film strength, adhesion and rate of solvent release of the composition. For these purposes rosin, maleic, phthallic or rosin esters, rosin blended with phenol-aldehyde resins, oil-soluble phenolic-aldehyde resins, polyterpenic resins and terpene-phenolic resins have been suggested because of their wide compatibility with other ingredients and their low cost. However, it has been found that such resins do not yield films of sufficient hardness, durability and adhesive strength that are required for many coating and adhesive applications.

It has heretofore been proposed that pre-formed phenol aldehyde resins be reacted with monomeric acylic terpenes to improve the physical properties of the resultant compounded films. It has also been proposed that phenols, aldehydes and terpenes be reacted together, or that phenolic-aldehyde resins be blended with terpenes for similar purposes. However, in none of these proposals does the resulting pure film or compounded film have sufficient toughness and adhesion for stringent coating and adhesion requirements, such as the coating or bonding of hard non-porous surfaces.

One object of this invention is to provide novel synthetic resins yielding films of high strength and adhesiveness. A further object of this invention is to provide such resins which can be used as a film reinforcer for oil modified coatings and rubber resin adhesives. A still further object of this invention is to provide such resins which can be used in the preparation of high film strength oleoresinous varnishes and heat set inks. Further objects and advantages of this invention will be apparent from this specification and appended claims.

In accordance with this invention it has been found that heating heat-hardening para-hydrocarbon substituted phenolic-aldehyde resins with resinous reaction products of terpenic compounds and phenols yield heat-hardening resins of high melting points, high film strength, wide compatibility and good solvent release. These new resins can be produced either by heating a molten mixture of the components or by heating the components in the presence of a solvent or dispersing medium. By varying the specific components, the ratio of one component to the other, and the time and temperature of heating, a series of resins is obtained having a wide range of colors, melting points and solubilities. Small quantities of resorcinol, formaldehyde, phenol, terpenes and other reactive monomers can be used to modify the reaction rate and solubility.

The heat hardening para-hydrocarbon substituted phenolic aldehyde resins which can be used in this invention are prepared by condensing a phenol whose para position is substituted by a hydrocarbon group, with an excess of methylene-releasing compounds. Preparation of such resins has been previously described in various patents including Turkington and Butler U. S. 2,173,346. In preparing such resins suitable phenols such as p-phenyl phenol, p-t-amyl phenol, p-cyclohexyl phenol, p-tertiary butyl phenol, n-butyl phenol, propyl phenol, p-hydroxydiphenol, and p-benzyl phenol are reacted in the presence of alkali with an excess of methylene releasing agent such as formaldehyde, hexamethylene tetramine, or para-formaldehyde. The reaction is usually stopped at an intermediate stage. The resultant resins are oil soluble and are often subsequently neutralized with mild acid such as lactic acid. It is generally believed that the excess of methylene releasing groups in the presence of the para substitution produces resins having short to medium molecular chains with reactive methylol groups at their ends, and little or no cross linkage. Heating of this resin alone is presumed to increase its chain length and complexity. However, such heating renders the resin insoluble in most aliphatic solvents, and affects its compatibility.

The condensation products of terpenic compounds and phenols have been described in various U. S. patents including Numbers 2,378,436; 2,343,845; 2,471,454; 2,471,453; 2,475,201; 2,284,156 and 1,469,709. Preparation of such terpene-phenolic resins is carried out by reacting a phenol with terpene hydrocarbons of the $C_{10}H_{16}$ series in the presence of catalysts such as boron trifluoride, hydrogen fluoride and substituted sulphonic acids. Since most terpene hydrocarbons as obtained in nature are mixtures, the probable structure of such resins consists of short molecular chains of alternating terpene and phenolic groups with a terpene periodicity. These resins have also been prepared in modified form by reacting a terpene, a phenol and relatively small amount of aldehyde together. The resultant chain structure is presumed to be similar except that a portion of the phenolic linkages have now been bound by the aldehyde groupings. Where the amount of aldehyde is small such modified terpene phenolic resins can be used in this invention, since there are sufficient reactive phenol components in the terpene-phenolic resin.

Two other types of modifications are common with terpene-phenolic resins, neither of which affect the reactivity of such resins in this invention. One is to use alcohol derivitives of terpenes in reacting with the phenol. An example is alphaterpineol. The chain structure of this resin is believed to be the same as that of the terpene-hydrocarbon-phenolic resin.

The other common modification of a terpene-phenolic resin is to modify or extend the resin by the addition of rosin or maleic anhydride with subsequent esterification of the rosin or anhydride. It has been found that the presence of such modifying ingredients does not substantially affect the practice of this invention.

In carrying out this invention ordinary equipment can be used, taking into consideration the fact that the reactions evolve water and gases. The preferred temperature range is from about 90° C. to 300° C. Below about 90° C. the reaction proceeds rather slowly while above 300° C. side reactions predominate such as the heat hardening of the phenol aldehyde resin. The ratio between the phenol-aldehyde and terpene-phenol components can be varied widely giving various mixtures of the primary reaction products, the original resins and the thermally self-reacted phenolic-aldehyde resins. The intermediate range, as for example three parts of the phenol aldehyde component to one part of terpene-phenolic component, yields reaction products of wide compatibility and solubility. The time required for the reaction to be completed is dependent upon the temperature, and presence of any modifying monomers as mentioned above and has been shown to vary from about three minutes to about seventy-two hours under average heating conditions. Resorcinol for example increases the reaction rate but decreases the solubility in aliphatic solvents.

Several specific embodiments of this invention are listed below. In these examples the symbol TP represents terpene-phenolic resin and the symbol HPA represents heat hardening p-hydrocarbon substituted phenol aldehyde resin.

*Example 1.*—100 parts of a TP resin melting at 150° C. were placed in a stainless steel, steam-jacketed, positive-agitation kettle and heated to 176° C. at which temperature the resin melted. 300 parts of HPA resin were introduced and agitated. When the mass temperature reached 150° C. a reaction took place, with the evolution of gaseous materials. Upon continued application of heat during a period of 30 minutes the reaction temperature reached 250° C. at which time the reaction was stopped.

The reaction product was a dark, red, hard, brittle resin soluble in aliphatic solvents, and having a melting point in excess of 150° C.

*Example 2.*—100 parts TP resin melting at 150° C. and 300 parts HPA resin were reacted with sufficient resorcinol such that the ratio was TP resin (1)/HPA resin (3)/resorcinol (0.1). The resorcinol is used as a hardening agent.

The reaction time was 5 minutes with a maximum reaction temperature of 175° C. After reaction the mass was chilled and yielded a dark resin having an indeterminate melting point substantially higher than that of Example 1. This was insoluble in aliphatic solvents but soluble in aromatic solvents.

*Example 3.*—1200 gms. of TP resin were heated with slow stirring in an aluminum beaker until fused at 157° C. 400 gms. HPA resin were then added and the entire mass heated for 10 minutes at a temperature between 175–210° C. The reacted material was then quickly cooled. It was found to be easily soluble in low kauri-butanol value solvents such as toluene. The resultant resin was amber colored and brittle. When dissolved in toluene with an equal amount of Neoprene AC (a polychloroprene rubber), it yields a material which is suitable for coatings and adhesives, and forms films that are hard, tough and adherent to metallic and non-metallic surfaces.

Neoprene solvent cements formed with the resin of Example 3 have higher bonding strength than that of either component resin as indicated below:

TABLE I

*Bond strength of canvas to galvanized iron*

| Number | 1 | 2 | 3 | 4 |
|---|---|---|---|---|
| Neoprene AC | 100 | 100 | 100 | 100 |
| Zinc Oxide | 5 | 5 | 5 | 5 |
| Magnesium Oxide | 4 | 4 | 4 | 4 |
| Neozone A | 1 | 1 | 1 | 1 |
| Terpene-phenolic resin | 100 | 0 | 0 | 0 |
| Hydrocarbon resin | 0 | 100 | 0 | 0 |
| Heat-hardening phenolic resin | 0 | 0 | 100 | 0 |
| New resin | 0 | 0 | 0 | 100 |
| Toluene | 400 | 400 | 400 | 400 |
| Bond strength in lbs./inch | 10 | 13 | 20 | 30 |

*Example 4.*—200 gms. of TP resin and 100 gms. of HPA resin were dissolved together in Apco 467 (a chlorinated hydrocarbon solvent). The mixture was then refluxed for 30 minutes at 215° C. The resultant resin solution when used as the base of heat-set inks showed a rapid solvent release, outstanding hardness and adhesion.

*Example 5.*—200 gms. of HPA resin and 400 gms. of TP resin were mixed for 20 minutes at 100° C. in a double armed dough mixer with steam-jacket and blades. The resultant material was a hard, amber resin having a melting point of 176° C. and excellent solubility characteristics. When formulated with a tung oil it yielded a long oil varnish of excellent hardness, durability, adhesion and abrasion resistance. An example of such a formulation is given below:

VARNISH RESIN

One hundred pounds of the resin were cooked with 25 gallons of China-wood oil at 480° F. until a 12 inch long string was obtained. The resulting varnish was thinned to 60% solids with mineral spirits. The dry, dust-free time was ½ hour; the tack-free time was two hours and the dry-hard time was 3½ hours. The abrasion, water, and weather resistance of this varnish was rated as excellent and superior to similar varnishes made from heat-hardening phenolic resins.

*Example 6.*—Similar to Example 5 except that the time was 2½ hours and the temperature 218° C. The product was insoluble in low kauri-butanol solvent and only slightly soluble in aromatic and polar solvents. The melting point was over 250° C., and was indeterminable.

In forming the principal reaction products of this invention it seems likely that the reaction takes place between the reactive methylol end-groups of the phenol-aldehyde resin and reactive portions of the phenol unit of the terpene-phenolic resin. The side reactions which as previously pointed out predominate at temperatures in excess of 300° C. or extreme excess of the phenol-aldehyde resin, are presumed to be the thermal self-condensations of the phenol aldehyde resin, by virtue of the reactive methylol end groups.

The resins prepared according to this invention and described above were evaluated in coatings, adhesives, varnishes and heat-set inks by substituting them for the usual resins in standard formulations. The products obtained had markedly great film strength, adhesion to non-porous surfaces and solvent release. In particular a great number of oleo-resinous varnishes and rubber-resin cements and adhesives were prepared using the products of this invention. It was found that the physical properties were improved over formulations utilizing phenolic, polyterpenic, abietic, maleic, or terpene-phenolic resins.

In the appended claims the term "terpene phenolic resin" is intended to include the modified terpene-phenolic resins as discussed above, in addition to the pure terpene hydrocarbon phenolic resins. The term "elastomer" is used as a synonym for "rubber" and is intended to include natural rubbers, synthetic rubbers and other synthetic polymeric materials which have rubbery-like properties.

We claim:

1. Resinous reaction products formed by heating together a preformed resin formed by reaction of a phenol and a terpene hydrocarbon with a heat-hardening resin formed by reaction of a para-hydrocarbon substituted phenol and an excess of methylene-releasing agent selected from the group consisting of formaldehyde, hexamethylene tetramine, and paraformaldehyde.

2. Resinous reaction products as in claim 1 wherein said resins are heated together in the molten state.

3. A composition containing the resinous reaction product of claim 1.

4. A solution containing a solvent, a rubbery conjugated diene polymer and the resinous reaction products of claim 1.

5. High melting resinous products readily soluble in low kauri-butanol aliphatic solvents and formed by heating in the fused state a preformed resin formed by reaction of a phenol and a terpene hydrocarbon with a preformed heat-hardening resin formed by reaction of a para-hydrocarbon substituted phenol and an excess of methylene-releasing agent selected from the group consisting of formaldehyde, hexamethylene tetramine, and paraformaldehyde.

6. An adhesive composition containing polychloroprene and the resinous reaction products of claim 1.

7. Resinous reaction products formed by heating together in the presence of a solvent a preformed resin formed by reaction of a phenol and a terpene hydrocarbon with a preformed heat-hardening resin formed by reaction of a para-hydrocarbon substituted phenol and an excess of methylene-releasing agent selected from the group consisting of formaldehyde, hexamethylene tetramine and paraformaldehyde.

8. A protective coating composition containing a drying oil and a resinous reaction product formed by heating together a preformed resin formed by reaction of a phenol and a terpene hydrocarbon with a preformed heat hardening resin formed from a para-hydrocarbon substituted phenol and an excess of methylene-releasing agent selected from the group consisting of formaldehyde, hexamethylene tetramine and para-formaldehyde.

9. A heat set ink containing a solvent and a resinous reaction product formed by heating together a preformed resin formed by reaction of a phenol and a terpene hydrocarbon with a preformed heat hardening resin formed from a para-hydrocarbon substituted phenol and an excess of methylene-releasing agent selected from the group consisting of formaldehyde, hexamethylene tetramine and para-formaldehyde.

References Cited in the file of this patent

FOREIGN PATENTS 637,262     Great Britain _____ May 17, 1950